Mar. 3, 1925.
E. MAIER
1,528,444
PENDULUM MECHANISM FOR CLOCKS
Filed June 17, 1924
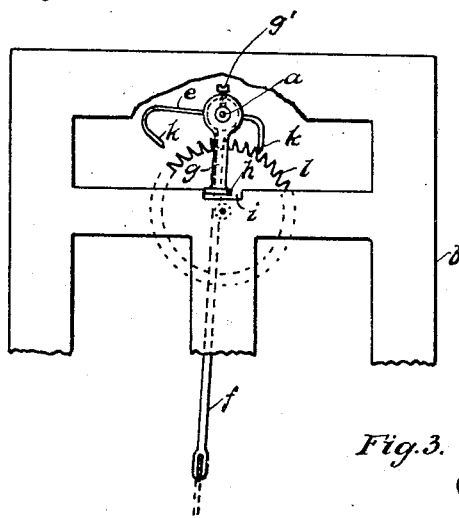
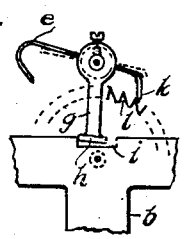
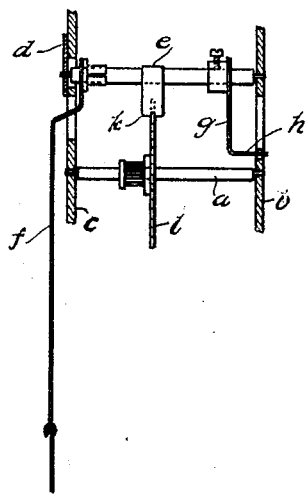
INVENTOR
*Erich Maier,*
BY
*Harold D. Penney* ATTORNEY Patented Mar. 3, 1925.

1,528,444

UNITED STATES PATENT OFFICE.

ERICH MAIER, OF SCHWENNINGEN-ON-THE-NECKAR, GERMANY, ASSIGNOR TO KIENZLE UHRENFABRIKEN A.-G., OF SCHWENNINGEN-ON-THE-NECKAR, GERMANY, A CORPORATION OF GERMANY.

PENDULUM MECHANISM FOR CLOCKS.

Application filed June 17, 1924. Serial No. 720,605.

*To all whom it may concern:*

Be it known that I, ERICH MAIER, citizen of the Republic of Germany, and resident of Schwenningen-on-the-Neckar, in Wurttemberg, Germany, have invented certain new and useful Improvements in Pendulum Mechanism for Clocks, of which the following is a specification.

This invention relates to a contrivance for the regulation of the pendulum throw in assembled pendulum clocks, without touching the anchor, by turning the verge wire or pendulum rod upon the anchor spindle. The pendulum rod is in the usual manner, rotatably adjustable on the anchor spindle with a slight amount of friction. The anchor spindle in addition carries a simple lever the end of which is angularly bent to swing within a recess of the clockwork frame, and will abut against one of the two ends of said recess upon regulation of the drop or upon turning of the pendulum rod, and as a consequence affords a firm stop for overcoming the friction of the rod on the arm before the anchor claws strike against the bottom of the space between the teeth of the escape wheel. Hence, where this device is used, damaging the sensitive escapement parts is avoided.

Simplicity in design results in the advantage of extremely economical manufacture of this device.

The device is shown in the annexed drawing, in which Fig. 1 is a front elevation of the device;

Fig. 2 is a side elevation; and

Fig. 3 is a fragmentary front elevation of the escapement.

The anchor spindle or pallet staff $a$ is supported for oscillation between the clockwork frames $b$, $c$, and the bridge $d$, and has riveted upon it the anchor $e$, and pendulum rod $f$ rotatably adjustable thereon with a slight friction. The spindle $a$ also carries a lever $g$, the end $h$ of which is bent rectangularly and projects into a recess $i$ of work frame $b$.

After the clockwork has been properly adjusted upon assembling the same, lever $g$ is so set, previous to being secured by the set screw $g'$, that upon oscillation of the anchor $e$ the bent end $h$ of lever $g$ will strike against one side or the other of recess $i$ before either of the anchor claws $k$ can strike against the bottom of the notch between the teeth of the escapement wheel $l$ (Fig. 1).

The operation of the device may be explained as follows:

If in a perpendicularly disposed assembled clock, the accurate position of rod $f$ with relation to the anchor $e$ be altered as by some outside action, so that the pendulum throw becomes unequal, with the result that the clock "limps", then in order to restore the correct position of the rod $f$ to the anchor $e$, it will be necessary to turn rod $f$ upon the anchor spindle $a$. Now, on turning the rod $f$, the anchor spindle $a$ will initially partake of movement with the anchor $e$ and lever $g$ until the bent end $h$ of the lever $g$, according to the direction of rotation, strikes against one of the two ends of the recess $i$, where it finds a firm stop. By the aid of such stop, the rod $f$ in virtue of its being held with a slight amount of friction on the anchor spindle $a$ can be made to continue turning and thereby be restored to the correct position with relation to the anchor.

I claim:

1. In combination, an anchor staff; an anchor fast thereon; a pendulum rod adjustably held on the staff; a lever held adjustably fast on said staff; and means for limiting the movement of said lever.

2. In combination, a clock work frame provided with a recess; an anchor staff in said frame; an anchor thereon; a pendulum rod adjustably held on the staff; and a lever held on said staff and oscillatory in said recess.

3. In combination, a clock work frame provided with an elongated recess; an anchor staff in said frame; an anchor fast thereon; a pendulum rod frictionally held on the staff; a lever held adjustably fast on said staff and having an angularly bent end oscillatory in said recess.

4. In combination, a clock work frame provided with an elongated recess; an anchor staff in said frame; an anchor fast thereon; an escapement wheel engaged by said anchor; a pendulum rod frictionally held on the staff; a lever held on said staff and having an angularly bent end oscillatory in said recess; and a set screw holding said lever fast on the staff.

Signed at Stuttgart, Germany, in the county of Stuttgart and State of Wurttemberg this 31st day of May, A. D. 1924.

ERICH MAIER.